June 21, 1960  J. P. PUGNAIRE ET AL  2,941,398
JET ENGINE THRUST STAND
Filed Aug. 16, 1956  2 Sheets-Sheet 1

INVENTORS
JEAN PIERRE PUGNAIRE
MALCOLM GREEN
BY
ATTORNEY

June 21, 1960     J. P. PUGNAIRE ET AL     2,941,398
JET ENGINE THRUST STAND
Filed Aug. 16, 1956     2 Sheets-Sheet 2
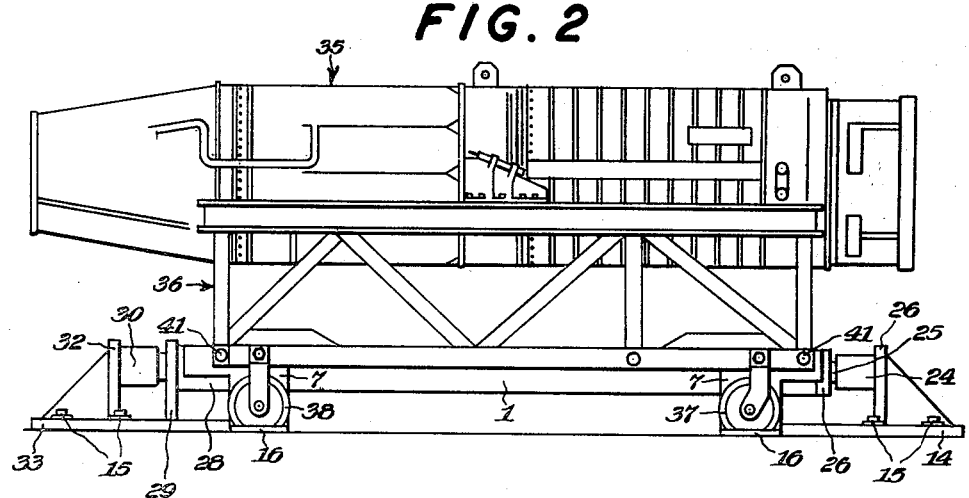
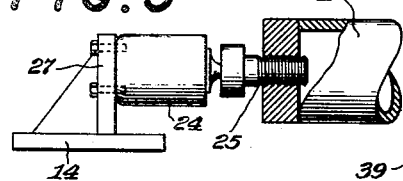
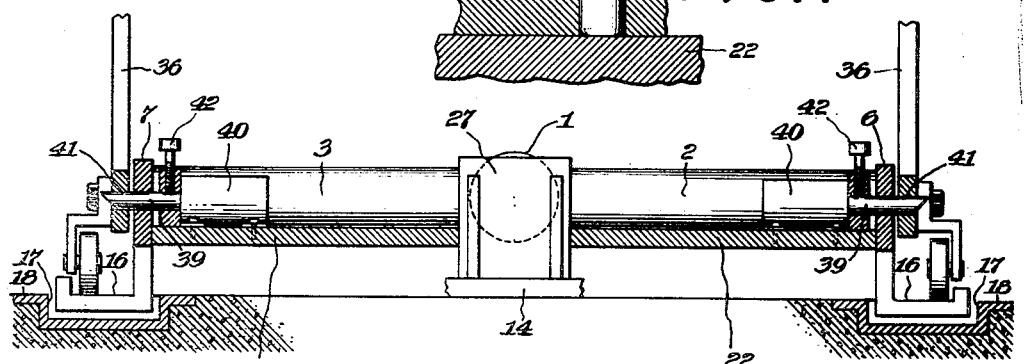
INVENTORS
JEAN PIERRE PUGNAIRE
MALCOLM GREEN
BY
ATTORNEY

United States Patent Office 2,941,398
Patented June 21, 1960

2,941,398
JET ENGINE THRUST STAND

Jean Pierre Pugnaire, Arlington, and Malcolm Green, Waban, Mass., assignors to Baldwin-Lima-Hamilton Corporation, a corporation of Pennsylvania Filed Aug. 16, 1956, Ser. No. 604,458

6 Claims. (Cl. 73—116)

This invention relates to jet engine thrust stands for measuring the engine thrust.

Various types of thrust stands have heretofore been proposed and used but the same have been deficient either functionally, structurally or economically. For instance, prior stands have been so complicated or cumbersome that they required a pit in which to be located thus adding to the expense of initial installation as well as subsequent maintenance. There have also been deficiencies in the prior devices affecting their accuracy and stability.

It is an object of our invention to provide an improved jet engine thrust stand that insures a high degree of accuracy, reliability and stability of operation and that permits the engine to be easily and effectively loaded on the thrust stand.

Another object is to provide an improved thrust stand in which the load measuring means is effectively located out of the path of the jet blasts without impairment in any way of the load measuring function.

Further objects are to provide an improved thrust stand that is relatively simple and economical in construction, operation and maintenance and in which the parts are so inter-related that only a single thrust measuring load cell need be used and to provide an improved combination which eliminates the need for an installation pit.

Other objects and advantages will be more apparent to to those skilled in the art from the following description of the accompanying drawings in which:

Fig. 2 is a diagrammatic side elevation of an engine mounted upon a dolly which is moved into and out of the stand;

Fig. 3 is a cross sectional view taken substantially on the line 3—3 of Fig. 1 to show how the dolly is supported on and locked to the thrust stand during a test;

Fig. 5 is a sectional view showing the means for pre-loading the load cell;

Fig. 6 is a fragmentary plan view of a modified safety device for the locking pin; and Fig. 7 is a transverse section taken on the line 7—7 of Fig. 6.

Figures 1, 4:
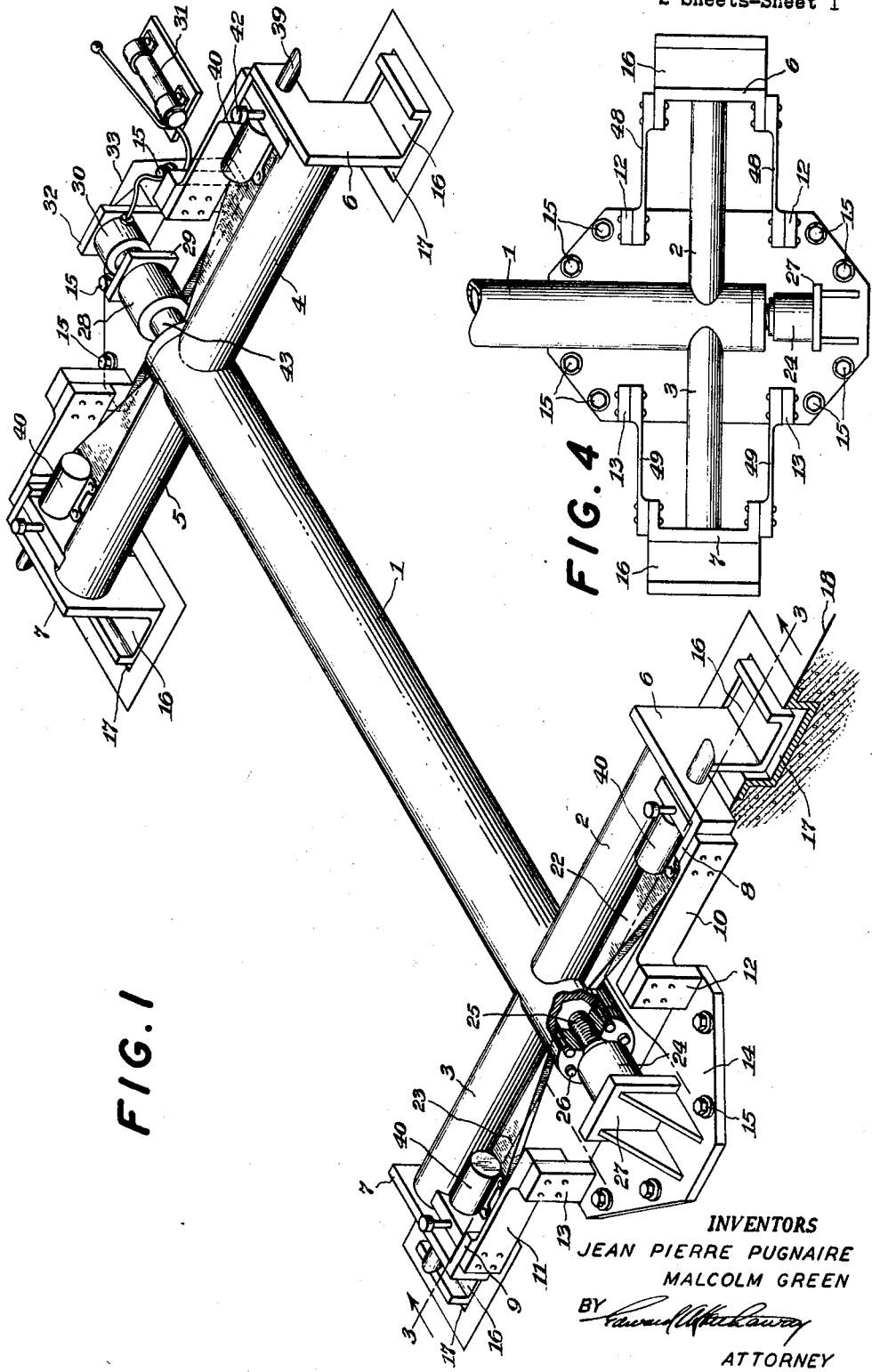
Fig. 1 is a perspective showing the general construction of our thrust stand.
Fig. 4 is a fragmentary plan view of a modified flexure guiding arrangement that may be used at each end of the stand.

Our improved thrust stand includes a frame consisting of what might be called a spine type construction having a longitudinal tubular member 1 extending throughout the length of the thrust stand and provided at its ends with laterally extending, preferably tubular, arms 2, 3, 4 and 5 suitably welded or otherwise secured to the central member 1. The description of one set of these arms and their associated structural elements will suffice for both ends as they are duplicates and, hence, similar reference numerals will be used for corresponding parts. The outer ends of the arms are provided with vertically extending end plates 6 and 7 having inturned portions 8 and 9 to which are connected the outer ends of relatively long lateral flexure plates 10 and 11. The inner ends of the flexure plates are rigidly connected to suitable uprights 12 and 13 projecting upwardly from a centrally located base plate 14 which may be suitably anchored by bolts 15 to a usual foundation. The stay plates 10 and 11 by having their flat sides lying in vertical planes not only permit free longitudinal movement of the thrust stand frame while guiding it laterally but also vertically supports the frame so that wheel supports 16, which are U-shaped extensions of end plates 6 and 7, are in a slightly raised position from the bottom of shallow ground pockets 17. The wheel supports 16 have the upper surface preferably level with the ground surface 18 although, if desired, the pockets 17 can be dispensed with and the wheel supports positioned slightly above the ground surface with suitable small ramps leading up to each end of the wheel supports to facilitate movement of the engine dolly into and out of position. In either case the wheel supports 16 by being a part of the movable portion of the stand eliminates any need to lift the dolly to prevent contact with the ground. The end brackets 6 and 7 may be reinforced with respect to the arms 2 by the provision of long laterally extending gusset plates 22 and 23 preferably secured to the component parts by welding. Thus it is seen that the thrust stand structure so far described is adapted to have free horizontal floating action combined with great lateral and vertical stability. The flex plates, by extending laterally from a central location, can provide a flexure of desired length without increasing the height of the frame above the ground.

At one end of the central spine member 1 is a load measuring means 24 preferably in the form of a single electrically responsive load cell although other types of load cells can be employed, if desired. The electrical load cell is preferably of the type employing bonded wire type strain gages well known in the art and, hence, it is not necessary to describe the same in detail other than to point out that one end of the load sensing column of the cell is pre-loaded to a desired extent through an adjustable screw 25 threaded in an end plate of spine 1. The screw bears against the spherical load button on the movable end of the load cell whose other end engages a stationary abutment plate 27 rigidly secured to the base plate 14.

To check the load cell 24, provision is made to insert a calibrating load cell 28, similar to the cell 24, between the other end of the central member 1 and a longitudinally movable loading plate 29 against which the piston of a loading jack 30 exerts a force by fluid pressure supplied from a suitable source such as a hand pump 31 although, if desired, a mechanical jack may be used also. The loading jack 30 is suitably supported against a stationary bracket 32 which is secured to a base plate 33 corresponding to the plate 14. The fulcrum plates at this end of the thrust stand are supported by the base plate 33 in the same manner as the flex plates at the left end of member 1. A comparatively low spring rate member 43, Fig. 1, adds to the ease of applying and maintaining calibrating loads.

As shown diagrammatically in Fig. 2, the jet engine, generally indicated at 35, is supported upon a dolly generally indicated at 36 which is provided with front and rear pairs of wheels 37 and 38. This dolly is rolled on to the wheel supports 16 at each end of the lateral arms 2—5 and the dolly is locked into position by four laterally movable locking pins 39 which project through the end brackets 6 and are operated by suitable piston and cylinder servo-motor units generally indicated at 40 whose supply of actuating fluid may be suitably valve-controlled to move the pins outwardly into suitable locking holes 41 in the dolly frame 36. Suitable screws 42 may be threaded in an offset portion of the end plates 6 and 7 to engage and lock the pins 39 in their extended position or, if desired, instead of screws 42 the locking pins 39 may be provided with offset vertical slots 46, Fig. 6, to allow safety pins 47 to drop by gravity into the slots when the pins 39 are moved outwardly to their locking position. The pins 47 are guided in a portion of the end plates 6 and 7.

In the modification of Fig. 4, the spine 1 is guided at each end by two pairs of parallel flex plates 48 and 49. This arrangement minimizes the possibility of the spine being twisted and also makes it possible to decrease the flexure restraint for a given length of flexure.

From the foregoing disclosure it is seen that we have provided an extremely simple jet engine thrust stand that is particularly effective in measuring thrust and insuring that jet blasts are completely remote from the load cell 24. It will be understood that the calibrating cell 28 is a highly precise load cell that may be removed from the thrust stand and used in many different thrust stands to check the accuracy of the permanent load cell in each stand. The construction of our improved thrust stand not only has the functional advantage of the load cell being completely out of the range of the jet blasts but is economical in construction, operation and maintenance and is extremely compact by reason of the flex plates, arms, longitudinal member 1, and load cell 24 all lying in a common horizontal plane thereby completely eliminating the need for a pit.

It will, of course, be understood that various changes in details of construction and arrangement of parts may be made by those skilled in the art without departing from the spirit of the invention as set forth in the appended claims.

We claim:

1. A jet engine thrust stand comprising, in combination, a frame consisting of a longitudinally extending member having laterally extending arms each end of which are provided with engine dolly supports, means including flexure plates for supporting said frame so that it has movement only in a longitudinal direction, thrust measuring means disposed at one end of said longitudinal member, and means operatively connected to the outer ends of said arms for locking the dolly to the frame for transmitting engine thrust longitudinally to the frame and thence to the load measuring means.

2. The combination set forth in claim 1 further characterized in that the flexure plates extend with their lengthwise axes substantially parallel to the lateral arms, means operatively connecting the outer ends of the plates to their respective arms near the outer ends thereof, and means for rigidly supporting the other ends of the flexure plates.

3. The combination set forth in claim 1 further characterized in that the thrust measuring means comprises a load cell connected to an end of said longitudinal member, and means providing a stationary abutment against which the load cell acts.

4. The combination set forth in claim 1 further characterized by the provision of a calibrating load cell and a loading jack at the other end of the longitudinal member, whereby a loading force may be produced by the jack to transmit a load through the calibration cell and thence through the longitudinal member to the thrust measuring means to check the performance of the thrust measuring means with that of the calibrating cell.

5. The combination set forth in claim 1 further characterized in that the flexure plates extend laterally from near the longitudinal member outwardly toward the end of the arms to which the plates are operatively connected, said plates, arms and longitudinal member lying in a substantially common horizontal plane.

6. The combination set forth in claim 1 further characterized in that the means for transmitting engine thrust to the frame includes laterally movable locking pins at the ends of the arms and servo-motors for actuating said pins.

References Cited in the file of this patent

UNITED STATES PATENTS 2,498,995     Manning               Feb. 28, 1950

OTHER REFERENCES

U.S. Navy—Project Squid—Technical Memorandum No. PR 4; Aero Resonator Power Plant of the V-1 Flying Bomb, by Guenther Diedrich, Princeton University Press, June 30, 1948, pages 17, 18.